United States Patent
Best et al.

(10) Patent No.: US 6,413,889 B1
(45) Date of Patent: Jul. 2, 2002

(54) PRESSING CUSHION

(75) Inventors: Walter Best, Duren; Ralf Kaldenhoff, Aachen, both of (DE)

(73) Assignee: Thomas Josef Heimbach Gesellschaft mit beschrankter Haftung & Co. (DE)

( * ) Notice: Subject to any disclaimer, the term of this patent is extended or adjusted under 35 U.S.C. 154(b) by 0 days.

(21) Appl. No.: 09/515,921

(22) Filed: Mar. 1, 2000

(30) Foreign Application Priority Data

Mar. 3, 1999 (EP) .............................................. 99104248

(51) Int. Cl.⁷ ............................ D04B 1/00; D04B 11/00; D04B 21/00; D04B 7/00; D04B 9/00
(52) U.S. Cl. ........................ 442/305; 442/316; 100/295
(58) Field of Search ................................ 442/305, 316; 100/295

(56) References Cited

U.S. PATENT DOCUMENTS

| | | | | |
|---|---|---|---|---|
| 1,012,030 A | * | 12/1911 | Underwood | |
| 3,596,657 A | * | 8/1971 | Eidus | 125/156 |
| 3,723,220 A | | 3/1973 | Scher et al. | 156/219 |
| 4,891,957 A | * | 1/1990 | Strack et al. | 66/192 |
| 5,298,322 A | * | 3/1994 | Hennecken et al. | 428/285 |
| 5,370,760 A | | 12/1994 | Mori et al. | 156/89 |
| 5,855,733 A | | 1/1999 | Douglas et al. | 156/583.1 |

FOREIGN PATENT DOCUMENTS

| | | |
|---|---|---|
| DE | 2230220 | 1/1974 |
| DE | 2338749 | 2/1975 |
| DE | 2344248 | 3/1975 |
| DE | 2319593 | 9/1976 |
| DE | 2627442 | 12/1977 |
| DE | 2650642 | 5/1978 |
| DE | 94189846 | 3/1995 |
| DE | 29518204 | 6/1996 |
| DE | 19521946 | 12/1996 |
| DE | 29721495 | 2/1998 |
| DE | 29721494 | 4/1998 |
| EP | 0 235 582 | 9/1987 |
| EP | 0361796 A2 | 4/1990 |
| EP | 0493630 | 7/1992 |
| EP | 0 920 982 A1 | 10/1998 |
| EP | 0 920 983 A1 | 10/1998 |
| JP | 10294407 A | * 11/1998 ............ H01L/23/36 |

* cited by examiner

Primary Examiner—Terrel Morris
Assistant Examiner—Norca L. Torres
(74) Attorney, Agent, or Firm—Liniak, Berenato, Longacre & White, LLP

(57) ABSTRACT

The invention concerns a pressing cushion (1, 11, 31, 32, 33) having a cushioning (2, 12) that is elastic in its thickness direction and having connecting threads (8, 25), going back and forth between the surfaces of the cushioning, that are configured at least partially as thermally conductive threads. The pressing cushion (1, 11, 31, 32, 33) is characterized in that connecting threads (8, 25) are provided which have a sewn profile or form knitted stitches.

23 Claims, 1 Drawing Sheet

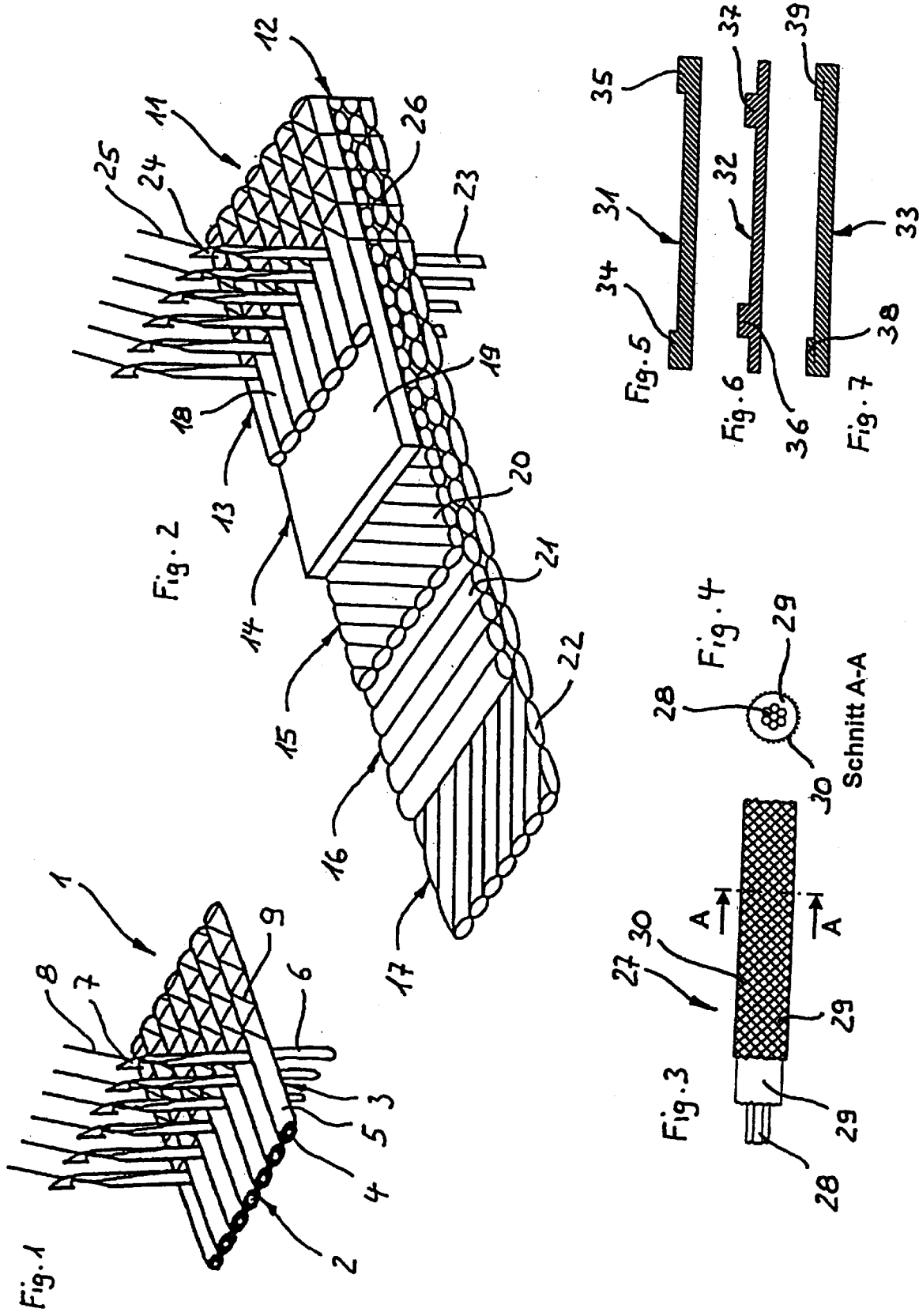

PRESSING CUSHION

FIELD OF THE INVENTION

The invention concerns a pressing cushion for use in laminating presses, having a cushioning that is elastic in the thickness direction and having connecting threads, going back and forth between the surfaces of the pressing cushion, that are configured at least partially as thermally conductive threads whose thermal conductivity is better than that of the cushioning.

BACKGROUND

The manufacture of layered materials, for example decoratively coated particle boards, is performed in laminating presses that can be configured as low- or high-pressure multiplaten presses or short-cycle presses. To ensure that the pressure of the press plates is transferred uniformly onto the pressed material over its entire surface, pressing cushions are inserted between the pressed material and the press plates. The pressing cushions must be capable of withstanding high pressures as well as the temperatures that occur in such presses, and they must be capable of transferring the heat proceeding from the press plates quickly and without major losses onto the pressed material. It is also desirable to be able to process pressed materials in different formats in succession with one pressing cushion.

The known pressing cushions can be divided into two groups. The one group involves layered designs. For example, DE-A-26 27 442 describes a pressing cushion in which a matted nonwoven fabric is coated on both sides with a silicone elastomer. EP-A-0 235 582 discloses a pressing cushion in which a silicone elastomer film is coated on both sides with a parting film. U.S. Pat. No. 3,723,3320 discloses a pressing cushion made of a silicone film that can additionally be equipped with a parting film.

Pressing cushions that are made of or contain a textile thread system in the form of a fabric are known in many embodiments, especially as regards the materials used therein. DE-B-23 19 593 discloses a pressing cushion whose basis is a metal sieve fabric that is enclosed in a matrix made of a silicone elastomer. The pressing cushion according to DE-A-23 38 749 has a glass fiber fabric in which individual or all threads are impregnated or coated with a plastic, for example a silicone elastomer, so that these threads form the cushioning. The teaching of DE-A-26 50 642 is similar. EP-A-0 493 630 proposes a pressing cushion made of a textile fabric in which the fabric is composed of aromatic polyamide threads and metal threads as thermally conductive threads. DE-U-295 18 204 discloses a pressing cushion in which one portion of the threads has a silicone elastomer and a further portion can be configured as metal wire. DE-U-94 18 984.6 describes a pressing cushion in which the threads can be made of a wide variety of materials, in particular of rubber, silicone elastomer, or metal, and combinations thereof. Lastly, DE-U-297 21 495 and DE-U-297 21 494 depict pressing cushions made of a fabric in which the individual threads are interwoven and configured in a particular fashion.

With the first group of pressing cushions, satisfactory thermal conductivity cannot be achieved. With the second group of pressing cushions, compromises must be made between thermal conductivity and dimensional stability, so that an optimum result in terms of those properties cannot always be obtained.

It is therefore the object of the invention to configure a pressing cushion in such a way that the thermal conductivity and dimensional stability can be adjusted within wide limits, and that in terms of the cushioning as well, a wide range of possible variations exists for designing the pressing cushion in accordance with requirements.

SUMMARY OF THE INVENTION

According to the present invention, this object is achieved in that connecting threads are provided which have a sewn profile or form knitted stitches. The basic idea of the invention is thus for at least a portion of the connecting threads, preferably all of the connecting threads, not to be interwoven with the cushioning, but rather for the connection to be made by sewing (which is also to be understood as quilting or embroidering) or knitting. It has been found that a strong overall structure having high dimensional stability can be achieved thereby. It is moreover possible, by way of the proportion of thermally conductive threads among the connecting threads—and the connecting threads can also all be configured as thermally conductive threads—and by way of the nature and quantity of the stitches, to adapt the thermal conductivity to the particular requirements within wide limits. A greater freedom in terms of configuring the cushioning also results. In this context, "thermally conductive threads" are to be understood as those threads which, because of their presence, improve the thermal conductivity of the pressing cushion in the thickness direction. If further connecting threads are present in addition to the stitch-forming connecting threads, these threads can be configured entirely or partially as thermally conductive threads, either in combination with thermally conductive threads of the stitch-forming connecting threads or indeed alone, if the stitch-forming connecting threads do not contain thermally conductive threads in the aforesaid sense. The overall result is to make available a structure for the pressing cushion that offers a substantially greater breadth of variation in terms of the aforesaid properties than has been attainable with the previously known fabric configurations.

The cushioning can be configured as a single-ply cushioning layer. There also exists the possibility, however, of configuring the cushioning with multiple plies and configuring at least one of the plies elastically in the thickness direction, all of the plies being interconnected by connecting threads.

As a detail, the elastic ply or at least one of the elastic plies can have or be made of cushion threads that are elastic in the thickness direction.

As an embodiment of this basic idea, the cushion threads can extend next to one another in the same direction in the particular ply; the cushion threads can be present as a layer or can be part of a fabric or of a knitted material. In this context, multiple plies having cushion threads can also be arranged one on top of another. It is advantageous in this case if the cushion threads of the plies extend in different directions, for example diagonally, transversely, or longitudinally, so that they cross one another.

The cushion threads can be made, for example, of an elastomeric material, such as silicone elastomer or fluorosilicone elastomer. They can, however, also be structured, in a manner known per se, in such a way that they each have a core thread made, for example, of metal wire that is surrounded by an elastomeric thread material, for example silicone elastomer. In addition, the cushion threads can also be at least partially surrounded by metal wire, for example in overbraided, wound, or stranded form, as is evident for example from DE-U-295 18 204 and DE-U-297 21 495. The elastomeric thread sheath can also, for example, be constituted from elastomeric threads that are wound or stranded around the core thread.

Instead of or in combination with cushion threads, the elastic ply or at least one of the elastic plies can also be made of an elastomer film. The film can be equipped with the elements that improve thermal conductivity, for example powders, threads, or fibers made of metal such as aluminum, bronze, stainless steel, copper, or brass. For reinforcement, the elastomer film can also contain a textile support that can be present as a fabric, thread layer, or knitted fabric.

In addition, the elastic ply or at least one of the elastic plies can also be configured as an elastic woven fabric or knitted fabric, or as a fiber batt, or as a combination of the aforesaid textiles.

The elastic ply or at least one of the elastic plies can, however, also be made of foamed material; the foamed material can contain the elements that improve thermal conductivity. Another possibility consists in providing a nonwoven ply; the nonwoven ply can have metal fibers in order to improve thermal conductivity. It is also possible, however, instead or in combination, to provide a fabric, thread layer, or a knitted material, the respective ply being made partially or entirely of metal threads. Combinations of the aforesaid plies are also possible, for example a combination of fabric, thread layer, or knitted material with a nonwoven ply.

If the pressing cushion is of multiple-layer configuration, it may also be advantageous if at least one of the plies is of incompressible configuration, being made for example as a metal foil or of foil strips.

As regards the thermally conductive threads, metals with good thermal conductivity, for example aluminum, bronze, stainless steel, copper, or brass, are suitable. The thermally conductive threads can, as wires or strands, be made entirely of these metals or can continuously contain them. It is possible in this context to configure the thermally conductive threads as plastic threads, for example from high-strength plastics such as aramid or polyimide, with a metal content.

Provision is also made, according to the invention, for thermally conductive threads and thermally non-conductive threads to alternate as weave threads [sic], the thermally non-conductive threads having a greater tensile strength than the thermally conductive threads, for example being made of aramid or polyimide.

Lastly, the invention provides for the pressing cushion to have edge thickenings, which can be achieved by the use of additional threads or ribbons, or forming loops at the edge. Folding the edges over and then sewing them up also yields such edge thickenings. This results in an equalization of pressure all the way into the edge regions.

The invention is illustrated in more detail, with reference to exemplary embodiments, in the drawings, in which:

BRIEF DESCRIPTION OF THE DRAWINGS

FIG. 1 shows an oblique view of a portion of a single-ply pressing cushion during manufacture;

FIG. 2 shows an oblique view of a portion of a multiple-ply pressing cushion during manufacture, the individual plies of the cushioning being depicted in stepped fashion;

FIG. 3 shows a side view of a cushion thread;

FIG. 4 shows a section through the cushion thread shown in FIG. 3; and

FIGS. 5 through 7 show pressing cushions with various edge thickenings.

DETAILED DESCRIPTION OF THE INVENTION

Pressing cushion 1 partially depicted in FIG. 1 has a cushioning layer 2 that is of single-ply configuration and comprises a plurality of cushion threads (labeled 3 by way of example) running parallel and next to another. Cushion threads 3 have a core thread (labeled 4 by way of example) that is configured as a metal strand and is surrounded by a thread sheath (labeled 5 by way of example) made of an elastomeric material, for example a silicone elastomer.

Projecting upward in each case between cushion threads 3 are needles (labeled 6 by way of example) of a conventional knitting machine that is not otherwise depicted. Needles 6 have at the top hooks (labeled 7 by way of example) that grasp the connecting threads (labeled 8 by way of example). By vertical movement of needles 6, stitches (labeled 9 by way of example) of a warp-knit fabric are formed around cushion threads 3. Cushion threads 3 thus penetrate through stitches 9 of the warp-knit fabric, the warp-knit fabric holding cushion threads 3 in the position shown; i.e. they hold them in a defined position immovably with respect to one another.

Connecting threads 8 are configured as metal wires. Some of connecting threads 8 can, however, also be made of a high-strength thread material, for example aramid or polyimide, or these materials can be combined with metal threads in a thread system. Connecting threads 8 ensure good thermal conductivity for pressing cushion 1, so that the heat proceeding from the press plates is transferred quickly and largely without loss to the pressed material. At the same time, cushion threads 3 ensure high elasticity in the thickness direction of pressing cushion 1, and thus fit in conforming fashion against the pressed material.

Pressing cushion 11 depicted in FIG. 2 differs from pressing cushion 1 of FIG. 1 in having a cushioning layer 12 of multiple-ply structure. This cushioning layer comprises a total of five plies 13, 14, 15, 16, 17. Top ply 13 has cushion threads (labeled 18 by way of example) which extend in the longitudinal direction and run parallel to one another, and are identical in configuration to cushion threads 3 in pressing cushion 1 of FIG. 1. Ply 14 is constituted by an elastic silicone elastomer film 19. Ply 15 therebelow comprises a thread layer made of cushion threads (labeled 20 by way of example); cushion threads 20 correspond to cushion threads 18 in ply 13, except that they run obliquely to the longitudinal direction of pressing cushion 11. Ply 16 lying therebelow in turn comprises a thread layer of cushion threads (labeled 21 by way of example) that run perpendicular to cushion threads 18 of ply 13, but otherwise are of identical configuration. Lastly, bottom ply 17 is constituted by a thread layer of cushion threads (labeled 22 by way of example) which run obliquely to the longitudinal direction of pressing cushion 1 but in a different direction than in ply 15.

Otherwise these cushion threads 22 also have the same configuration as cushion threads 18 in the topmost ply 13. It is understood that the stepped depiction serves only to make the configuration of the individual plies 13, 14, 15, 16, 17 clearly evident. Plies 13, 14, 15, 16, 17 can moreover be constructed from different materials, fiber cross sections, fiber finenesses, etc.

Cushioning layer 12 is pushed through between cushion threads 18 by needles (labeled 23 by way of example) of a knitting machine. Its top-mounted hooks (labeled 24 by way of example) grasp connecting threads (labeled 25 by way of example). Needles 23 are moved vertically in such a way that they form, as in the case of the manufacturing process of pressing cushion 1 shown in FIG. 1, stitches (labeled 26 by way of example) of a warp-knit fabric; stitches 26 grasp the entire cushioning layer 12 and thus join the individual plies 13, 14, 15, 16, 17 of the cushioning layer immovably to one another. Here again, some or all of connecting threads 25 are configured as thermally conductive threads, which contain a metal component or are made thereof. Despite the thickness of cushioning layer 12, this ensures good thermal conduction from lower side to upper side and vice versa.

FIGS. 3 and 4 show a particular cushion thread 27 for use, for example, in pressing cushions 1, 11. This cushion thread 27 has a core thread 28 that is configured as a stranded metal wire. Core thread 28 is surrounded by a silicone elastomer jacket 29. On the outer side, silicone elastomer jacket 29 is overbraided with metal wires (labeled 30 by way of example), imparting a high level of thermal conductivity to cushion thread 27. Instead of the overbraided metal wires 30, it is also possible to use wound or stranded metal wires, as proposed in DE-U-297 21 494.

FIGS. 5 through 7 show outline cross sections of pressing cushions 31, 32, 33 which have edge thickenings 34, 35, 36, 37, 38, 39. Edge thickenings 34, 35, 36, 37, 38, 39 can be produced by using additional cushion threads, increasing the stitch density, introducing ribbons, or forming loops. In the exemplary embodiment shown in FIG. 7, edge thickenings 38, 39 are formed by turning over the edges.

We claim:

1. A pressing cushion having a cushioning that is elastic in its thickness direction and having connecting threads, going back and forth between first and second opposed surfaces of the cushioning, at least some of said connecting threads are thermally conductive, wherein at least some of said connecting threads have a sewn profile or form knitted stitches and said pressing cushion is elastic.

2. The pressing cushion as defined in claim 1, wherein the connecting threads having a sewn profile or forming knitted stitches are thermally conductive.

3. The pressing cushion as defined in claim 1, wherein the cushioning is configured as a single-ply cushioning layer.

4. The pressing cushion as defined in claim 1, wherein the cushioning is configured as a multiple-ply cushioning layer, and at least one of the plies is configured elastically in the thickness direction, all of the plies being interconnected by connecting threads.

5. The pressing cushion as defined in claim 1, wherein the cushioning comprises at least one elastic ply that has or is made of cushion threads that are elastic in the thickness direction.

6. The pressing cushion as defined in claim 5, wherein the cushion threads extend next to one another in the same direction in the particular ply.

7. The pressing cushion as defined in claim 5, wherein the cushion threads are present as a layer or are part of a fabric or of a knitted material.

8. The pressing cushion as defined in claim 5, wherein multiple plies having cushion threads are arranged one on top of another, the cushion threads of the plies extending in different directions.

9. The pressing cushion as defined in claim 5, wherein the cushion threads each have a core thread that is surrounded by an elastomeric thread sheath.

10. The pressing cushion as defined in claim 9, wherein the thread sheath is made of a silicone elastomer or fluoro-silicone elastomer.

11. The pressing cushion as defined in claim 9, wherein the cushion threads are at least partially surrounded by metal wire.

12. The pressing cushions as defined in claim 1, wherein the cushioning comprises at least one elastic ply made of an elastomer film.

13. The pressing cushion as defined in claim 12, wherein at least one of the elastomer films contains elements that improve thermal conductivity.

14. The pressing cushion as defined in claim 12, wherein the elastomer film contains a textile support.

15. The pressing cushion as defined in claim 1, wherein the cushioning comprises at least one elastic ply is configured as an elastic woven or knitted fabric, or as a fiber batt, or a combination thereof.

16. The pressing cushion as defined in claim 1, wherein the cushioning comprises at least one elastic ply made of a foamed material.

17. The pressing cushion as defined in claim 16, wherein the foamed material contains elements that improve thermal conductivity.

18. The pressing cushion as defined at least in claim 4, wherein at least one of the plies is incompressible.

19. The pressing cushion as defined in claim 18, wherein the incompressible ply or at least one of the incompressible plies is configured as metal foil or is made of foil strips.

20. The pressing cushion as defined in claim 1, wherein the thermally conductive threads are made of metal threads or fibers or continuously contain them.

21. The pressing cushion as defined in claim 1, wherein the thermally conductive threads are configured as plastic threads with a metal content.

22. The pressing cushion as defined in claim 1, wherein thermally conductive threads and thermally non-conductive threads alternate as connecting threads, the thermally non-conductive threads having a greater tensile strength than the thermally conductive threads.

23. The pressing cushion as defined in claim 1, wherein the pressing cushion has edge thickenings.

* * * * *